United States Patent

[11] 3,602,095

| [72] | Inventors | Boris Mikhailovich Bocharov<br>ulitsa Vesnina, 3, kv. 1;<br>Vladimir Ivanovich Vishnevsky, ulitsa<br>Aivazovskogo, 75; Stepanovich Alexandr,<br>ulitsa Ivanovskaya, 16, kv. 6, all of<br>Zaporozhie, U.S.S.R. |
|------|-----------|---|
| [21] | Appl. No. | 787,401 |
| [22] | Filed | Dec. 27, 1968 |
| [45] | Patented | Aug. 31, 1971 |
| [32] | Priority | Oct. 3, 1968 |
| [33] | | U.S.S.R. |
| [31] | | 1108872 |

[54] DEVICE FOR MACHINING METAL STRIP EDGES
7 Claims, 6 Drawing Figs.

[52] U.S. Cl. .................................................. 90/24 F,
83/368, 83/433
[51] Int. Cl. .................................................. B23d 1/00
[50] Field of Search ........................................ 90/24.06,
24.01, 18, 11, 24.02, 24.04, 24; 51/80.1, 80.1 A;
83/368, 433

[56] References Cited
UNITED STATES PATENTS

| 1,439,370 | 12/1922 | Lambert | 90/24-06 X |
| 2,848,787 | 8/1958 | Berg | 90/24-06 X |
| 3,254,568 | 6/1966 | Pickard | 90/24-06 X |
| 3,425,167 | 2/1969 | Pope | 51/80-1 |

FOREIGN PATENTS

| 446,015 | 3/1968 | Switzerland | 90/24-06 X |

*Primary Examiner*—Gil Weidenfeld
*Attorney*—Waters, Roditi, Schwartz and Nissen ABSTRACT: Apparatus for machining edges of metal strips includes a plurality of carriages slidably supported freely on a frame in a direction perpendicular to the direction of feed of the metal strips. The carriages are supported in planes differing in elevation and include rests for guiding the metal strips longitudinally and rectilinearly. The rests include cutters for engaging opposite longitudinal sides of the metal strips for cutting same simultaneously.

DEVICE FOR MACHINING METAL STRIP EDGES

The present invention relates to equipment for machining metal strips, and more particularly it relates to devices for machining metal strip edges, preferably, for deburring the edges of strips made of electric steel.

Known in the prior art are devices for machining of metal strip edges (see the British Pat. No. 881,300 cl. 83/3/ ).

However, in the known devices the rests, carrying the cutters, are connected to the base of the device by means of flexible connections in such a way, that during the movement of the metal strip the rests follow each movement thereof, which does not ensure the rectilinearity of the machined edge shear. These devices do not allow the machining of several metal strips simultaneously, which reduces the output of the device.

Moreover, in these devices the rollers, between which the machined strip passes, destroy the coating in the case where the machined strip, made of electric steel, has an insulating coating.

An object of the present invention is to eliminate the above-mentioned disadvantages.

The main object of the invention is to provide a device, ensuring the rectilinearity of the nut of the metal strip machined edges and simultaneous machining of several metal strips.

This problem is achieved by means of a device for machining edges of metal strips preferably, for deburring edges of metal strips made of electric steel, movable relative to the cutters, fixed on the rests, wherein, according to the invention, the rests are placed on carriages, at least on one carriage, freely movable a lateral direction relative to the direction of movement of the machined metal strips.

It is expedient to position the carriages in different planes. The device can contain rollers, by means of which the strip being machined is directed to the corresponding carriage, these rollers being longer than the sum of the widths of the machined strips.

It is expedient to position a vibration damper for the metal strip being machined on each rest, said damper being constituted of as a plate with a slot for said strip passing.

The device constructed in accordance with this invention, ensures the rectilinearity of the shear of the metal strip machined edges.

Moreover, the fact that the carriages are located in different planes, allows a machining of several metal strips simultaneously, which considerably increases the device output. The use of this device for machining electric steels is especially effective as in this case the insulating coating is not destroyed.

The present invention is further described by way of example with reference to the accompanying drawings wherein.

Figure 1:
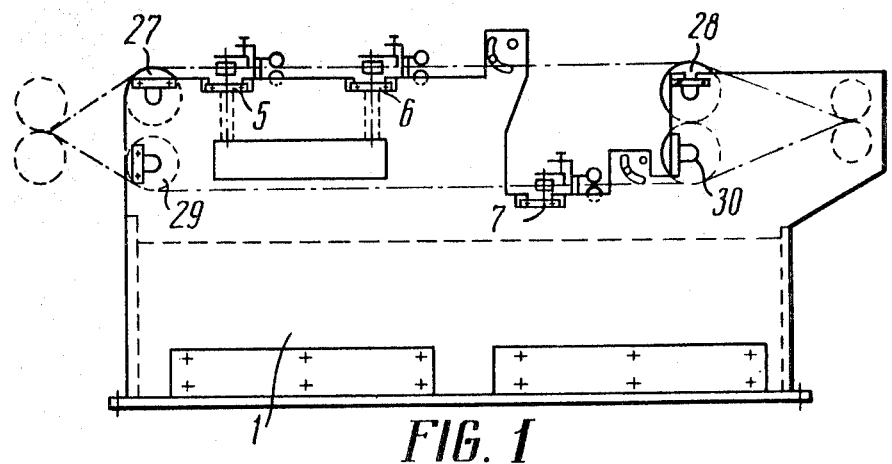
FIG. 1 is a diagrammatic side elevation view of a device for treating edges of metal strips, according to the invention.

The device for machining the edges of metal strips comprises a frame 1 (FIG. 1) having lateral guides 2, 3 and 4 (FIG. 2), wherein carriages 5, 6 and 7 are installed. Each of these carriages is installed in the guides 2, 3 and 4 on two pairs of rollers 8 (FIG. 3) having horizontal axes and on two pairs of rollers 9 having vertical axes so, that these carriages may freely move together with strips 10, 11, 12 (FIG. 2) being machined in the lateral direction relative to the direction of movement of these strips (along arrow A).

Figure 2:
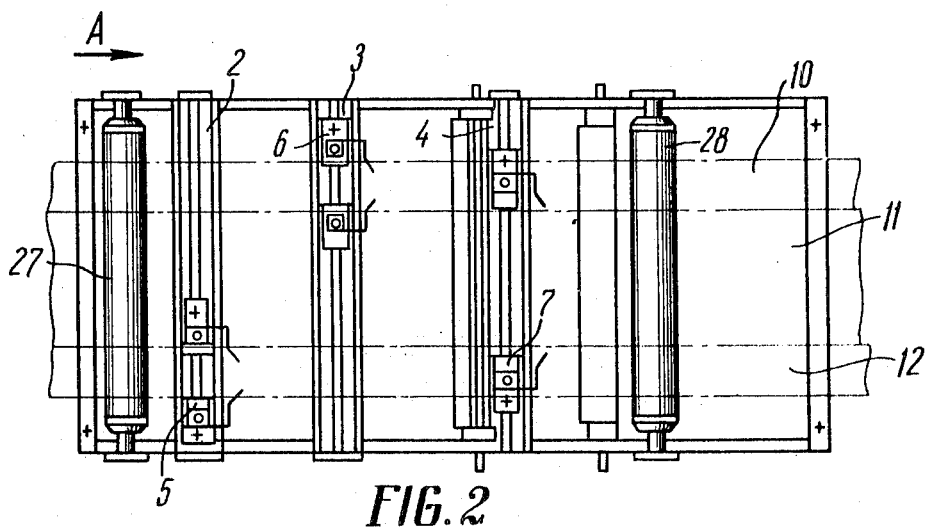
FIG. 2 is a top plan view of the same.

The carriages 5, 6 and 7 are positioned in two planes, that is, the carriage 7 (FIG. 1) is positioned lower, than the carriages 5 and 6. It is this location of the carriages, that provides for the simultaneous machining of three metal strips 10, 11 and 12 (FIG. 2).

Each carriage 5, 6 and 7 has guides 13 (FIG. 3), intended for setting rests 14, fixed at both sides of each metal strip 10, 11 and 12 by means of bolt 43 and lock nut 44 (FIG. 4) according to the width of the me strips being machined. Such a setting of the rests 14 ensures the rectilinearity of the edges being machined.

Figure 4:
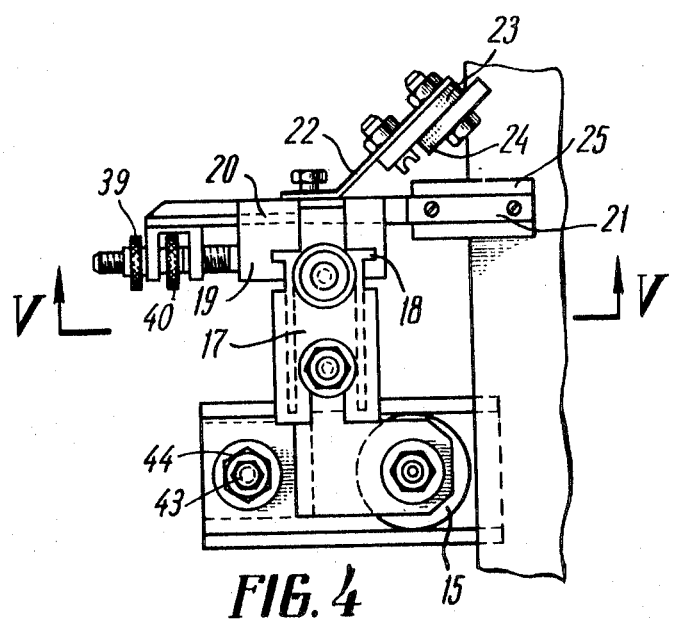
FIG. 4 is a top plan view of the rest.
Figure 5:
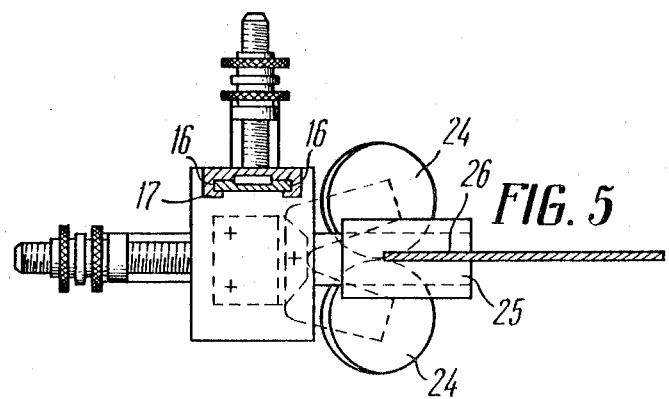
FIG. 5 is a section, taken along the line V—V of FIG. 4.

Each rest 14 carries a bearing roller 15 (FIG. 4) and has guides 16 (FIG. 5), intended for setting a bracket 17, having its own guides 18 (FIG. 4).

Figure 3:
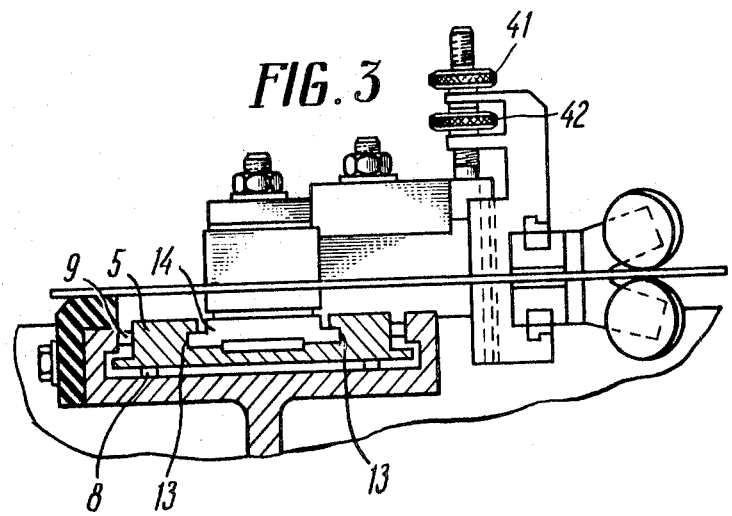
FIG. 3 shows a lateral section of the carriage with the rest installed thereon.

The guides 18 of the bracket 17 are intended for the installation of a slide 19, which, in turn, has its own guides 20, intended for installing a slide 21 together with a bracket 22, fixed thereon, said bracket carrying a tool holder 23 with two cutters 24. The width of the cut at the edges of the strip being machined is controlled by moving slide 21 by means of nuts 39 and 40 (FIG. 4). The height of the cutters 24 relative to the strip being machined is regulated by means of nuts 41, 42 (FIG. 3, 5).

A vibration damper 25 is installed on the slide 21, said damper being essentially a plate with a slot 26 (FIG. 5) for the passage of the strip therethrough.

Installed on the frame 1 (FIG. 1) are guiding rollers, that is, two upper rollers 27 and 28 and two lower rollers 29 and 30. These rollers are longer than the sum of the widths of the machined strips 10, 11 and 12 (FIG. 2), which allows the machining of the edges of the strips, made of electric steel without destroying the current insulating coating of the strips.

Figure 6:
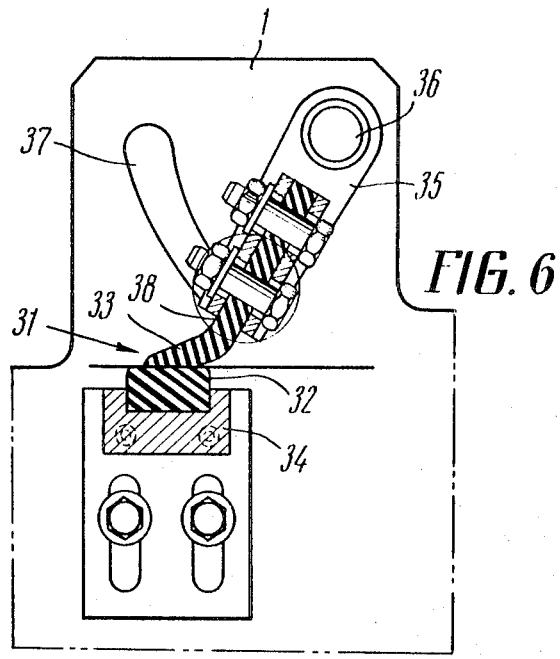
FIG. 6 shows a lateral section of an arrangement for chip removal.

The device for machining the edges of metal strips is provided with two arrangements 31 (FIG. 6), positioned in different planes similarly as the carriages 5, 6 and 7 and are intended for removing chips from the machined metal strips 10, 11 and 12 (FIG. 2). Each of the arrangements 31 comprises a lining 32 (FIG. 6) and a resilient member 33. The lining 32 is made of soft current insulating material, intended for holding the machined metal strips 10, 11 and 12 (FIG. 2) and is installed on two brackets 34 (FIG. 6), fixedly connected to the frame 1. The resilient member 33 is made of resilient material, installed in a bracket 35, suspended on a shaft 36, fixed on the frame 1. The position of the resilient member 33 is fixed in slots 37 by means of a handle 38.

The device for machining the edges of metal strips operates as described below.

The metal strips 10, 11 and 12 (FIG. 2), issuing from a feeding device (not shown in the drawing), are directed by the upper roller 27 (FIG. 1) and the lower roller 29 to the respective carriages 5, 6 and 7 (FIG. 2) and pass between the rests 14 (FIG. 3), which are so installed, that the bearing roller 15 (FIG. 4) of each of said rests contacts one of the edges of the metal strips 10, 11 and 12 (FIG. 2). In this position the rests 14 (FIG. 3) are rigidly fixed in the guides 13 of the carriages 5, 6 and 7 (FIG. 2). Each pair of rests 14 is fixed to the width of the strip being machined and the rigid fixation of said rests is performed prior to fine adjustment of the position of cutters 24 relative to the metal strip edges. Then the metal strips 10, 11 and 12 are fed to the cutters 24 through the slots 26 (FIG. 5) of the dampers 25 and then to the arrangement 31 for the removal of chips and to the guiding rollers 28 and 30 (FIG. 1). From these rollers the metal strips 10, 11 and 12 (FIG. 2) are directed to a receiving device (omitted in the drawing).

The width of the cut, removed from the edges of the metal strips 10, 11 and 12 is adjusted by moving the slide 21 (FIG. 4) with cutters 24 along the guides 20 and thus with respect to the rests 14 now fixed with respect to the carriage. The adjustment of the cutters 24 as to their height is performed by moving the slide 19 along the guides 18.

Each pair of rests 14, rigidly fixed to the carriages 5, 6, 7 by the bolts 43 and lock nuts 44 with the cutters 24 adjusted in the above manner, can move freely together with the carriages 5, 6, 7 transversely to the movement of the strip undergoing machining by travel of rollers 8, 9 along guides 2, 3, 4 exactly following transverse fluctuations of the strips as transferred to carriages 5, 6, 7 through rollers 15.

A similar layout of a device for machining edges of metal strips can be employed for simultaneous machining of the edges of any number of strips.

It should be borne in mind, that the embodiment of the present invention, described hereinabove and shown in the accompanying drawings, is a preferable embodiment of the present invention. Various modifications of the invention are possible as concern its shape, size and the location of various members and are contemplated as defined by the appended claims.

What we claim is:

1. Apparatus for machining edges of metal strips, said apparatus comprising a frame, a plurality of carriages slidably supported on said frame, means for feeding said metal strips longitudinally to respective carriages, said carriages being slidably supported freely in a direction transversely of said metal strips being fed longitudinally, said metal strips having opposite longitudinal sides, said carriages including fixedly adjustable rests at said opposite longitudinal sides of said metal strips and means on said rests for engaging the sides of the strip for constraining longitudinal movement of said metal strips rectilinearly, and cutting means supported on said rests, each of said cutting means being adjustable transverse to a respective metal strip for simultaneously cutting said opposite longitudinal sides of each of said metal strips.

2. Apparatus as claimed in claim 1 wherein at least two of said carriages are slidably supported freely on said frame in respective planes differing in elevation.

3. Apparatus as claimed in claim 2 wherein each of said carriages includes two rests, between which rests respective metal strips are interposed, said cutting means being supported on respective rests in opposing relation on opposite sides of said metal strips.

4. Apparatus as claimed in claim 3 wherein said rests each includes vibration damping means for damping respective vibrations of said metal strips being machined.

5. Apparatus as claimed in claim 4 wherein said vibration damping means includes a plate provided with a slot through which said strips respectively pass.

6. Apparatus as claimed in claim 4 wherein said vibration damping means are disposed in spaced pairs in opposing relation on opposite sides of said metal strips.

7. Apparatus as claimed in claim 4 wherein said vibration damping means are supported on said rests for receiving said metal strips prior to the passage of said strips to said cutting means.